(12) United States Patent
Hanamoto et al.

(10) Patent No.: US 9,782,750 B2
(45) Date of Patent: Oct. 10, 2017

(54) ACTIVATED CARBON FOR NOBLE METAL ADSORPTION, NOBLE METAL ADSORPTION FILTER, AND METHOD FOR RECOVERING NOBLE METALS

(71) Applicants: Kuraray Co., Ltd., Kurashiki-shi (JP); TANAKA KIKINZOKU KOGYO K.K., Chiyoda-ku (JP)

(72) Inventors: Tetsuya Hanamoto, Bizen (JP); Takayuki Yamada, Bizen (JP); Yoshichika Sabae, Hiratsuka (JP)

(73) Assignees: KURARAY CO., LTD., Kurashiki-shi (JP); TANAKA KIKINZOKU KOGYO K.K., Chiyoda-ku (JP)

( * ) Notice: Subject to any disclaimer, the term of this patent is extended or adjusted under 35 U.S.C. 154(b) by 95 days.

(21) Appl. No.: 14/410,319

(22) PCT Filed: Jun. 21, 2013

(86) PCT No.: PCT/JP2013/067033
§ 371 (c)(1),
(2) Date: Dec. 22, 2014

(87) PCT Pub. No.: WO2013/191269
PCT Pub. Date: Dec. 27, 2013

(65) Prior Publication Data
US 2015/0190781 A1    Jul. 9, 2015

(30) Foreign Application Priority Data

Jun. 22, 2012    (JP) .................................. 2012-141349

(51) Int. Cl.
*C22B 3/22* (2006.01)
*C22B 3/24* (2006.01)
(Continued)

(52) U.S. Cl.
CPC ........... *B01J 20/2808* (2013.01); *B01J 20/20* (2013.01); *B01J 20/2803* (2013.01);
(Continued)

(58) Field of Classification Search
CPC .. B01J 20/2808; B01J 20/20; B01J 20/28071; B01J 20/28073; C01B 31/08; C22B 3/24; C22B 11/04
See application file for complete search history.

(56) References Cited

U.S. PATENT DOCUMENTS 1,617,206 A    2/1927  Feild
4,260,493 A *  4/1981  Kretas ...................... C02F 1/76
                                                    210/714
(Continued)

FOREIGN PATENT DOCUMENTS

CN    101010760 A    8/2007
CN    101844842 A    9/2010
(Continued)

OTHER PUBLICATIONS

Molina-Sabio, M., F. Rodriguez-Reinoso, F. Caturla, and M. J. Selles. "Development of Porosity in Combined Phosphoric Acid-Carbon Dioxide Activation." Carbon 34.4 (1996): 457-62. Science Direct. Web. Mar. 6, 2017. <http://www.sciencedirect.com/science/article/pii/000862239500209X>.*

(Continued)

*Primary Examiner* — George Wyszomierski
*Assistant Examiner* — Tima M McGuthry Banks
(74) *Attorney, Agent, or Firm* — Oblon, McClelland, Maier & Neustadt, L.L.P.

(57) ABSTRACT

In an activated carbon for adsorbing a noble metal from an aqueous solution containing the noble metal, the difference (absolute value) between a zeta-potential in a 10 mmol/L aqueous solution of sodium tetraborate and a zeta-potential (Continued)

in a 0.01 mmol/L aqueous solution of sodium tetraborate is adjusted to not more than 18 mV and the pore volume of pores with a pore radius of not more than 1 nm is adjusted to 150 to 500 mm$^3$/g. The activated carbon of the present invention may have a carbohydrate solution decolorizing performance of not less than 30%. The aqueous solution containing the noble metal may be a plating wastewater. According to the present invention, a noble metal can efficiently be adsorbed (or recovered) from a solution containing the noble metal.

14 Claims, 2 Drawing Sheets (51) Int. Cl.
*C22B 11/00* (2006.01)
*B01J 20/28* (2006.01)
*C01B 31/10* (2006.01)
*C01B 31/12* (2006.01)
*C22B 3/00* (2006.01)
*C02F 1/28* (2006.01)
*B01J 20/20* (2006.01)
*C02F 101/20* (2006.01)
*C02F 103/16* (2006.01)

(52) U.S. Cl.
CPC ... *B01J 20/28061* (2013.01); *B01J 20/28071* (2013.01); *B01J 20/28073* (2013.01); *C01B 31/10* (2013.01); *C01B 31/12* (2013.01); *C02F 1/283* (2013.01); *C22B 3/22* (2013.01); *C22B 3/24* (2013.01); *C22B 11/04* (2013.01); *C02F 2101/20* (2013.01); *C02F 2103/16* (2013.01); *Y02P 10/234* (2015.11)

(56) References Cited

U.S. PATENT DOCUMENTS

| | | | | |
|---|---|---|---|---|
| 4,292,176 A | * | 9/1981 | Grutsch | B01J 20/20 210/616 |
| 5,891,324 A | | 4/1999 | Ohtsuka | |
| 6,106,589 A | | 8/2000 | Hirata et al. | |
| 6,865,068 B1 | | 3/2005 | Murakami et al. | |
| 7,202,195 B2 | * | 4/2007 | Cannon | B01J 20/20 502/416 |
| 8,277,654 B2 | * | 10/2012 | Levy | B01D 39/2058 210/266 |
| 2002/0168309 A1 | | 11/2002 | Doubrava et al. | |
| 2003/0062312 A1 | * | 4/2003 | Cannon | B01J 20/20 210/694 |
| 2003/0209106 A1 | | 11/2003 | Doubrava et al. | |
| 2005/0242041 A1 | * | 11/2005 | Cumberland | C02F 1/505 210/660 |
| 2011/0182000 A1 | | 7/2011 | Gadkaree et al. | |
| 2011/0210062 A1 | * | 9/2011 | Wang | B01J 20/3042 210/496 |

FOREIGN PATENT DOCUMENTS

| | | |
|---|---|---|
| CN | 102167319 A | 8/2011 |
| CN | 102251110 A | 11/2011 |
| EP | 0 794 240 A1 | 9/1997 |
| EP | 1 049 116 A1 | 11/2000 |
| EP | 1 064 996 A1 | 1/2001 |
| EP | 1 224 972 A1 | 7/2002 |
| EP | 1 321 534 A2 | 6/2003 |
| JP | 58-221240 A | 12/1983 |
| JP | 08-034605 A | 2/1996 |
| JP | 08-281099 A | 10/1996 |
| JP | 10-121156 A | 5/1998 |
| JP | 2001-011001 A * | 1/2001 |
| JP | 2001-303148 A | 10/2001 |
| JP | 2002-274828 A | 9/2002 |
| JP | 2007-39313 A | 2/2007 |
| JP | 2009-024200 A | 2/2009 |
| WO | WO 2011/091092 A2 | 7/2011 |

OTHER PUBLICATIONS

Suzuki et al. JP 2001-011001 A published Jan. 2001. Machine translation.*
International Search Report dated Aug. 20, 2013 in PCT/JP2013/067033 Filed Jun. 21, 2013.
Extended European Search Report dated Jan. 29, 2016 in Patent Application No. 13807762.3.
Combined Chinese Office Action and Search Report dated May 11, 2016 in Patent Application No. 201380040957.2 (with English Translation and English Translation of Category of Cited Documents).
Office Action dated Nov. 16, 2016, in corresponding Taiwan Patent Application No. 102122119 (with English-language Translation).

* cited by examiner

ACTIVATED CARBON FOR NOBLE METAL ADSORPTION, NOBLE METAL ADSORPTION FILTER, AND METHOD FOR RECOVERING NOBLE METALS

TECHNICAL FIELD

The present invention relates to an activated carbon for adsorbing a noble metal from an aqueous solution containing the noble metal, a noble metal adsorption filter containing the activated carbon, and a method for recovering a noble metal using the activated carbon.

BACKGROUND ART

Noble metals (or precious metals) are not only in demand for jewelry but also in demand industrially due to electrical and chemical properties thereof, for example, an electronic apparatus, including a printed wiring board. Noble metals are also widely used for dental materials, medical materials, various catalysts, and others. In particular, nowadays the prices of the noble metals are rising against the backgrounds of the expansion of the overseas market and the speculation purposes due to economic anxiety. Thus, for the purpose of cutting down production costs, it is urgently necessary to reduce the amount of noble metals to be used or to recycle noble metals.

As a method for recovering a noble metal from a wastewater (or a waste fluid) containing a low concentration of the noble metal, use of an ion exchange resin or an activated carbon is known. Unfortunately, the ion exchange resin or the activated carbon has a low capacity to absorb a noble metal in some wastewaters that have a high acid concentration, a high alkali concentration, a high salt concentration, a high impurity concentration, or the like. Thus the use of the ion exchange resin or the activated carbon is industrially unsatisfactory. Another known method includes use of a resin having a special functional group added thereto for adsorbing a noble metal selectively. Unfortunately, not only does the resin hardly adsorb a low concentration of a noble metal ion, but the production cost of the resin is high. Thus repeated use of the resin requires alternate adsorption and desorption. Moreover, the decrease in adsorption rate, desorption rate and purity due to repeated use is also difficult to inhibit sufficiently. In a case where the resin is burned in recovering noble metals undesorbed finally, there is a problem that harmful components are released to the environment. Further, this method needs a high recovery cost and is industrially unsatisfactory.

Moreover, a method using an activated carbon for recovering a noble metal is also known. For example, Japanese Patent Application Laid-Open Publication No. 2009-24200 (JP-2009-24200A, Patent Document 1) reports a method for separating and recovering a noble metal; the method comprises: dissolving a metal component of a waste electronic part in an aqueous separation solution containing a cyan ion, adding sodium hypochlorite to the resulting solution to maintain an oxidation-reduction potential of not less than +350 mV (silver/silver chloride electrode) and further adding a mineral acid to the solution to adjust the pH to 6 to 8, then throwing an activated carbon into the solution while stirring to adsorb a noble metal on the activated carbon, separating the activated carbon by filtration, and recovering the noble metal from the activated carbon separated.

Unfortunately, this method requires complicated steps, and in addition, there is a variation in the concentration of the noble metal in the solution every batch. Thus in order to recover the noble metal efficiently, it is necessary to determine the amount of the activated carbon required for adsorbing a noble metal beforehand by a spot test. This method has a low productivity and is unfavorable in view of industry.

Japanese Patent Application Laid-Open Publication No. 2001-303148 (JP-2001-303148A, Patent Document 2) reports a method for treating a detergent drain containing palladium; the method comprises: adding a coagulant to a detergent drain containing a palladium catalyst added in an electroless plating step to precipitate a palladium-containing slurry, then dissolving the palladium-containing slurry in a mineral acid, and passing the resulting dissolved solution through a capture column of an activated carbon loaded with a reducing agent to adsorb palladium metal on the column. This document discloses that a hydroquinone derivative is effectively used as the reducing agent.

Although this method can relatively easily recover a noble metal, the method costs a great deal because of the hydroquinone derivative used as the reducing agent. In addition, since the hydroquinone derivative plugs pores of the activated carbon due to adsorption, the adsorption amount of the noble metal is also insufficient.

RELATED ART DOCUMENTS

Patent Documents

Patent Document 1: JP-2009-24200A (Claims)
Patent Document 2: JP-2001-303148A (Claims, paragraph)

SUMMARY OF THE INVENTION

Problems to be Solved by the Invention

It is therefore an object of the present invention to provide an activated carbon for noble metal adsorption that can efficiently adsorb (or recover) a noble metal from a liquid containing the noble metal (in particular, a weak aqueous solution containing the noble metal) with a high yield without passing through any complicated step, a noble metal adsorption filter containing the activated carbon, and a method for recovering a noble metal using the activated carbon.

Another object of the present invention is to provide an activated carbon for noble metal adsorption that is easy to handle and can recover a noble metal in the state of a simple substance from a liquid containing the noble metal, a noble metal adsorption filter containing the activated carbon, and a method for recovering a noble metal using the activated carbon.

It is still another object of the present invention to provide an activated carbon for noble metal adsorption that has a high adsorption speed and can efficiently adsorb a noble metal from a liquid containing the noble metal even in a liquid-permeable filter, a noble metal adsorption filter containing the activated carbon, and a method for recovering a noble metal using the activated carbon.

It is a further object of the present invention to provide an activated carbon for noble metal adsorption that can efficiently adsorb a low concentration of palladium contained in a plating rinse wastewater, a noble metal adsorption filter containing the activated carbon, and a method for recovering a noble metal using the activated carbon.

Means to Solve the Problems

The inventors of the present invention started studies on improvement in a capacity of an activated carbon to adsorb a noble metal with the focus on a chemical structure of a surface of an activated carbon in addition to a pore structure of an activated carbon. The studies on the chemical structure of the surface proceeded with the focus on the presence of a functional group on the surface. However, since the amount of the functional group on the surface of the activated carbon was measured by titration, it was difficult to determine the functional group qualitatively and quantitatively because of various disturbance factors, such as the influence of ash or the influence of acid remaining after washing. Thus the relationship between the functional group and the noble metal adsorption has not been found thoroughly. Moreover, since the functional group on the surface of the activated carbon has an oxygen atom, the oxygen atom % was calculated by wave-form separation analysis of O1s in XPS (X-ray Photoelectron Spectroscopy). Unfortunately, the relationship between the functional group and the noble metal adsorption has not been found completely. The inventors of the present invention focused attention on the charge state of the surface due to the functional group and found that there is a relationship between the charge state and the noble metal adsorption when a zeta ($\zeta$) potential in an aqueous solution of sodium tetraborate (which is a weak alkaline aqueous solution) is used as an index. Specifically, the inventors found that an activated carbon having little difference between a zeta-potential in a 10 mmol/L aqueous solution of sodium tetraborate and a zeta-potential in a 0.01 mmol/L aqueous solution of sodium tetraborate shows an excellent capacity to adsorb a noble metal.

The reason why the activated carbon having little difference in potential shows an excellent adsorption capacity is unknown, although the following can be presumed. That is, an activated carbon having a large number of functional groups dissociable on a surface thereof increases in the capacity to adsorb a noble metal ion electrostatically and inhibits the reduction of the noble metal ion. In contrast, since the surface of the activated carbon having the above difference in zeta-potential has a small number of functional groups dissociated and charged in an aqueous solution of sodium tetraborate, it is presumed that a noble metal ion is adsorbed on the activated carbon not electrostatically but in a reduced state. Further, due to the small number of the functional groups dissociated and charged in the aqueous solution, the noble metal is easy to aggregate. Since the fine particle of the reduced noble metal is aggregated on the surface of the activated carbon, the activated carbon presumably shows a high capacity to adsorb the noble metal. This is also understood from the fact that the metal is adsorbed in a membrane (or film) form on the adsorption surface of the activated carbon.

Further, about the pore structure, the inventors of the present invention discovered that an adsorption capacity of an activated carbon is considerably affected by a volume of a pore having not more than 1 nm, and found that the adsorption capacity of the activated carbon can be improved by combining the adjustment of the range of the pore volume with the specific chemical structure of the surface based on the difference in zeta-potential.

That is, the activated carbon for noble metal adsorption according to the present invention is an activated carbon for adsorbing a noble metal from an aqueous solution containing the noble metal, and the activated carbon has a difference (absolute value) of not more than 18 mV between a zeta-potential in a 10 mmol/L aqueous solution of sodium tetraborate and a zeta-potential in a 0.01 mmol/L aqueous solution of sodium tetraborate and has a total pore volume of pores with a pore radius of not more than 1 nm of 150 to 500 mm$^3$/g. The activated carbon of the present invention may have a carbohydrate solution decolorizing performance (or decolorizing performance of carbohydrate solution) of not less than 30%. The aqueous solution containing the noble metal may be a plating wastewater.

The present invention also includes a noble metal adsorption filter (or a filter for noble metal adsorption or a filter for adsorbing a noble metal) containing the activated carbon for noble metal adsorption in a proportion of not less than 20% by mass. The filter of the present invention may be a liquid-permeable filter, and the activated carbon may have a carbohydrate solution decolorizing performance of not less than 30%.

Further, the present invention includes a method for recovering a noble metal from an aqueous solution containing the noble metal, and the method comprises adsorbing the noble metal on the activated carbon for noble metal adsorption or the noble metal adsorption filter.

Effects of the Invention

According to the present invention, since the difference in zeta-potential of an activated carbon in an aqueous solution of sodium tetraborate and the pore volume of the activated carbon are adjusted within specific ranges, the activated carbon allows efficient adsorption (or recovery) of a noble metal from a liquid containing the noble metal (in particular, a weak aqueous solution containing the noble metal) with a high yield without passing through any complicated step. Moreover, the activated carbon is easy to handle and can recover a noble metal in the state of a simple substance from a liquid containing the noble metal. In particular, an activated carbon having a large number of functional groups recovers a metal oxide with a low percent recovery, while the activated carbon can recover a noble metal in the state of a simple substance with a high percent recovery probably because a reduced noble metal accumulates like a plating layer on the surface of the activated carbon. Further, adjustment of the carbohydrate solution decolorizing performance of the activated carbon to not less than 30% allows improvement in adsorption speed. Even a liquid-permeable filter containing the activated carbon can efficiently adsorb a noble metal from a liquid containing the noble metal. In particular, the activated carbon of the present invention can efficiently adsorb a low concentration of palladium contained in a plating rinse wastewater.

DESCRIPTION OF EMBODIMENTS

[Activated Carbon for Noble Metal Adsorption]

The activated carbon for noble metal adsorption of the present invention has a difference (absolute value) of not more than 18 mV (for example, 0 to 18 mV) between a zeta-potential in a 10 mmol/L aqueous solution of sodium tetraborate and a zeta-potential in a 0.01 mmol/L aqueous solution of sodium tetraborate at an ordinary temperature (25° C.). An activated carbon having a difference in zeta-potential over 18 mV increases in the capacity to adsorb a noble metal ion electrostatically and inhibits the reduction of the noble metal ion, due to the presence of a large number of functional groups dissociable in an aqueous solution of sodium tetraborate. In addition, such an activated carbon fails to adsorb the noble metal ion with a high percent recovery, because the noble metal ion is easy to adsorb in the state of an oxide and the adsorption of the noble metal ion depends on the amount of the functional group. That is, since the adsorption capacity of such an activated carbon depends on the amount or species of the functional group and the pH value of the aqueous solution, the adsorption capacity fluctuates depending on the state of the aqueous solution containing the noble metal; thus the activated carbon is difficult to handle.

Moreover, in terms of the noble metal adsorbability, the difference (absolute value) in zeta-potential may be, for example, not more than 15 mV (e.g., 0.01 to 15 mV) or may be, for example, not more than 12 mV (e.g., 0.1 to 12 mV), preferably not more than 10 mV (e.g., 0.1 to 10 mV), and more preferably not more than 5 mV (e.g., 1 to 5 mV). Further, in order to more selectively adsorb a noble metal than a base metal, the difference (absolute value) in zeta-potential may be, for example, about 3 to 15 mV, preferably about 5 to 12 mV, and more preferably about 8 to 11 mV.

Moreover, the activated carbon for noble metal adsorption of the present invention may have a zeta-potential in a 10 mmol/L aqueous solution of sodium tetraborate of about −60 to 0 mV, for example, about −50 to −5 mV, preferably about −45 to −10 mV, and more preferably about −40 to −20 mV. In a case where the zeta-potential in this concentration is within the above range, the activated carbon can efficiently adsorb a low concentration of a noble metal contained in a plating wastewater.

In the present invention, the zeta-potential can be measured according to the method described in after-mentioned Examples.

The activated carbon of the present invention has a pore volume (total pore volume) of pores with a pore radius of not more than 1 nm of 150 to 500 mm$^3$/g. An activated carbon having such a pore volume of less than 150 mm$^3$/g decreases in the adsorption amount of a noble metal due to a small volume to be substantially subjected to adsorption or reducing reaction. An activated carbon having such a pore volume of more than 500 mm$^3$/g has a low bulk density and fails to obtain a sufficient noble metal adsorption amount per unit volume.

Further, the pore volume may be about 200 to 450 mm$^3$/g, preferably about 250 to 420 mm$^3$/g, and more preferably about 300 to 400 mm$^3$/g (in particular, about 350 to 380 mm$^3$/g).

In the present invention, the pore volume of pores with a pore radius of not more than 1 nm can be measured according to the method described in the after-mentioned Examples.

The activated carbon of the present invention preferably has a higher carbohydrate solution decolorizing performance in the light of the adsorption speed. Specifically, the carbohydrate solution decolorizing performance may be not less than 30% (e.g., 30 to 100%), for example, not less than 50% (e.g., about 50 to 99%), preferably not less than 70% (e.g., about 70 to 98%), and more preferably about 80 to 97% (in particular, about 85 to 95%). An activated carbon having the carbohydrate solution decolorizing performance within the range described above is suitable for a dynamic filter (e.g., a liquid-permeable filter) because a material to be adsorbed (e.g., a noble metal ion) is easy to move and diffuse inside such an activated carbon and is adsorbed on the activated carbon at a high adsorption speed. For an activated carbon having the carbohydrate solution decolorizing performance of less than 30%, it sometimes takes a long time to adsorb a noble metal.

The activated carbon of the present invention may have a BET specific surface area, calculated by a nitrogen adsorption method, selected from the range of about 100 to 5000 m$^2$/g; for example, the BET specific surface area is about 300 to 4000 m$^2$/g, preferably about 500 to 3000 m$^2$/g (e.g., about 1000 to 2500 m$^2$/g), and more preferably about 1500 to 2300 m$^2$/g (in particular, about 1800 to 2200 m$^2$/g). An activated carbon having an excessively small specific surface area decreases in the adsorption amount of a noble metal due to a small volume to be subjected to adsorption or reducing reaction. An activated carbon having an excessively large specific surface area has a low adsorption capacity due to a low bulk density.

The form of the activated carbon of the present invention may include, but should not be limited to, a granular form, a fibrous form, and an amorphous form. The activated carbon is usually in a granular form or a fibrous form. A granulated activated carbon may have an average primary particle diameter of, for example, about 1 μm to 5 mm (in particular, about 10 μm to 2 mm). A fibrous activated carbon may have an average fiber diameter of, for example, about 1 to 500 μm, preferably about 2 to 300 μm, and particularly about 5 to 50 μm.

[Process for Producing Activated Carbon for Noble Metal Adsorption]

The activated carbon for noble metal adsorption of the present invention is produced by carbonizing a carbonaceous material and then activating the carbonized carbonaceous material.

The carbonaceous material may include, but should not be limited to, for example, a plant carbonaceous material [for example, a material derived from a plant, such as a wood, a sawdust, a charcoal, a fruit shell (such as a coconut shell or a walnut shell), a fruit seed, a by-product of pulp production, a lignin, or blackstrap molasses (or black treacle)], a mineral carbonaceous material (for example, a material derived from a mineral, such as peat, lignite, brown coal, bituminous coal, anthracite coal, coke, coal tar, coal tar pitch, petroleum distillation residue, or petroleum pitch), a synthetic-resin-series carbonaceous material [for example, a material derived from a synthetic resin, such as a phenolic resin, a poly(vinylidene chloride), or an acrylic resin], and a natural-fiber-series carbonaceous material [for example, a material derived from a natural fiber, such as a natural fiber (e.g., a cellulose) or a regenerated fiber (e.g., a rayon)]. These carbonaceous materials may be used alone or in combination. Among these carbonaceous materials, a plant carbonaceous material (e.g., a coconut shell) is preferred in terms of easiness of development in pore volume having a pore radius of not more than 1 nm.

As an activation method, a gas activation or a chemical activation may be used. The gas activation and the chemical activation may be used in combination.

A gas to be used for the gas activation may include vapor (water vapor), carbon dioxide gas, oxygen gas, LPG exhaust combustion gas, or a mixed gas thereof, and others. In consideration of safety and reactivity, a gas containing 10 to 50% by volume water vapor (a vapor-containing gas) is preferred.

The activation temperature is, for example, about 700 to 1100° C. and preferably about 800 to 1000° C. The activation time and the rate of heating are not particularly limited and may suitably be selected depending on the species, form and size of a carbonaceous material to be selected.

A chemical activator to be used for the chemical activation may include, a chemical agent having dehydration, oxidization, and erosive action, for example, zinc chloride, potassium hydroxide, sodium hydroxide, phosphoric acid, potassium sulfide, sulfuric acid, and various alkalis. These chemical activators may be used alone or in combination. Among these chemical activators, zinc chloride or phosphoric acid is preferred in terms of easiness of development in pore volume having a pore radius of not more than 1 nm. The concentration and amount of the chemical activator may suitably be selected depending on the species of a chemical activator to be used, the amount of a raw material, and others.

In a case where phosphoric acid is used, the activation is performed by mixing a carbonaceous raw material with phosphoric acid in a mixing ratio of about 30 to 95 parts by mass (preferably 60 to 80 parts by mass) of phosphoric acid relative to 100 parts by mass of the carbonaceous raw material and heating the mixture at 300 to 750° C. for about 20 minutes to 10 hours (preferably about 30 minutes to 5 hours). In a case where zinc chloride is used and the concentration of zinc chloride is about 40 to 70% by mass, for example, the amount of zinc chloride is about 0.4 to 5.0 times, preferably about 1.0 to 4.5 times, and more preferably about 1.5 to 3.5 times, as large as the amount of the carbonaceous raw material on the basis of mass. The activation time is, for example, about 20 minutes to 10 hours and preferably about 30 minutes to 5 hours. The activation is performed at a temperature of not higher than the boiling point of zinc chloride (732° C.). The activation temperature is usually about 450 to 730° C. and preferably about 550 to 700° C.

The activated carbon after activation may be washed for removing the ash or the chemical agent. The activated carbon after washing may be heat-treated under an inactive gas atmosphere in order to remove impurities unremoved by washing. Sufficient removal of impurities by heat treatment can prevent contamination of impurities in burning and ashing the activated carbon having a noble metal adsorbed thereon and extracting the noble metal from the resulting ashed product. Moreover, the activated carbon after activation may be pulverized. In a case where the activated carbon after activation is in a fibrous form, the activated carbon may be cut.

For the pulverization, various means may be used according to an objective particle size, for example, a jaw crusher, a hammer mill, a pin mill, a roller mill, a rod mill, a ball mill, and a jet mill.

[Noble Metal Adsorption Filter]

It is sufficient that the noble metal adsorption filter (or the filter for noble metal adsorption or the filter for adsorbing a noble metal) of the present invention contains the activated carbon. For example, the noble metal adsorption filter may be a formed product of a mixture containing the activated carbon and a binder.

The proportion of the activated carbon in the noble metal adsorption filter may be not less than 20% by mass and is, for example, about 20 to 97% by mass, preferably about 30 to 95% by mass, and more preferably about 35 to 90% bymass. In a case where the proportion of the activated carbon in the noble metal adsorption filter is too small, the adsorption amount of the noble metal tends to be decreased.

It is sufficient that the binder can form the activated carbon into a formed product. For example, the binder may be a binder for bonding an activated carbon to form a formed product or may be a binder for supporting an activated carbon to a substrate constituting a filter. As the binder, there may usually be employed a fibrillated fiber and/or a thermoplastic binder particle.

The fibrillated fiber may be a pulpy fiber obtainable by opening a fibrillatable fiber using a high-pressure homogenizer or a high-speed disintegrator (or refiner). The fibrillated fiber has an average fiber diameter of, for example, about 0.1 to 50 μm and preferably about 1 to 20 μm. The fibrillated fiber has an average fiber length of, for example, about 0.5 to 4 mm and preferably about 1 to 2 mm. Concrete examples of a fiber constituting the fibrillated fiber may include an acrylic fiber, a polyethylene fiber, a polypropylene fiber, a polyacrylonitrile fiber, a cellulose fiber, a polyamide fiber, and an aramid fiber. Among them, an acrylic fiber or a cellulose fiber is preferred in terms of easiness of fibrillation and high binding on the activated carbon. As a commercially available product, for example, "Bi-PUL", which is a homoacrylic pulp manufactured by Japan Exlan Co., Ltd., is obtainable.

It is sufficient that the thermoplastic binder particle is formed from a thermoplastic polymer that can be melted to bond an activated carbon. Concrete examples of the thermoplastic polymer may include a polyolefin, a polystyrene, a poly (methyl methacrylate), a polyacrylonitrile, an ethylene-vinyl acetate copolymer, a polyester, a polyamide, a polyurethane, and others. These polymers may be used alone or in combination. Among them, a widely used binder includes a polyethylene, a polypropylene, a polystyrene, an ethylene-vinyl acetate copolymer, a poly (ethylene terephthalate), a poly (butylene terephthalate), a poly (methyl methacrylate), and others. In terms of binding capacity or others, a polyethylene is particularly preferred. In the light of excellent sheet strength and formability, the thermoplastic binder particle has an average particle diameter of, for example, about 0.1 to 200 μm and preferably about 1.0 to 50 μm.

The noble metal adsorption filter can be produced by a conventional method, depending on the species of the binder.

In a case where the fibrillated fiber is used as the binder, the noble metal adsorption filter is preferably formed by a wet forming. A process for producing a filter using the fibrillated fiber by a wet forming may include, for example, a process that comprises a slurry-preparing step and a drying step; in the slurry-preparing step an activated carbon and a fibrillated fiber are mixed, and the mixture is dispersed in water to give a slurry having a solid content of about 0.1 to 10% by mass (in particular about 1 to 5% by mass), and in the drying step water is removed from the slurry prepared. In the drying step, the slurry may be dried by pouring the slurry into a water-permeable box container formed from a stainless-steel wire gauze or the like and draining water, or by filling the slurry into a given-shaped sheet-like cavity of a die with a large number of through-holes and removing water in the slurry via the through-holes under vacuum suction. As the latter drying step by suction, the method described in Japanese Patent No. 3516811 publication or other methods may be used. In the light of well-balanced water flow resistance (hydraulic resistance), formability, and others, the ratio of the fibrillated fiber relative to 100 parts by mass of the activated carbon may be about 1 to 20 parts by mass and preferably about 3 to 10 parts by mass. Further, in a case where the binder is a fibrillated fiber, the activated carbon may also be in a fibrous form.

In a case where the thermoplastic binder particle is used as the binder, the noble metal adsorption filter is preferably formed by a dry forming. A process for producing a filter containing the thermoplastic binder particle by a dry forming may include, for example, an injection molding that comprises a mixing step and molding step; the mixing step comprises stirring and mixing an activated carbon powder and a thermoplastic binder particle in a desired ratio in a mixer (e.g., a Henschel mixer), and the molding step comprises filling the resulting mixture into a sheet-like cavity of a die, heating the die to a temperature not lower than the melting point of the thermoplastic binder particle to melt or soften the binder particle, and then cooling the melted or softened product for solidification. In the light of excellent sheet strength and formability, the ratio of the thermoplastic binder particle relative to 100 parts by mass of the activated carbon may be, for example, about 5 to 50 parts by mass and more preferably about 7 to 20 parts by mass.

[Method for Recovering Noble Metal]

According to the present invention, use of the activated carbon for noble metal adsorption and the noble metal filter allows a noble metal to be recovered from an aqueous solution containing the noble metal. Specifically, the noble metal can be recovered by allowing an aqueous solution containing a noble metal to contact with the activated carbon for noble metal adsorption and the noble metal filter and desorbing the noble metal adsorbed on the activated carbon for noble metal adsorption and the noble metal filter.

The noble metal may include, for example, gold, silver, ruthenium, rhodium, palladium, osmium, iridium, and platinum. These noble metals may be contained alone or in combination in the aqueous solution. Among these noble metals, a group 9 metal (such as palladium or platinum), particularly palladium, is preferred.

The noble metal content of the aqueous solution is not particularly limited to a specific one. In the light of efficient adsorption and recovery of the noble metal, an aqueous solution containing the noble metal at a concentration of not more than 1000 mg/L in terms of mass of the noble metal is preferred. In a case where the noble metal content is more than 1000 mg/L, the noble metal is rapidly adsorbed on the activated carbon to blockade the pores of the activated carbon. Thus there are some cases where the activated carbon decreases in saturation adsorption or is required in large quantity.

Even if the aqueous solution containing the noble metal contains other metals, inorganic salts or organic matters in addition to the noble metal, the noble metal can efficiently be adsorbed on the activated carbon. In particular, use of the difference in oxidation-reduction potential allows the noble metal to be separated from a base metal (e.g., iron, nickel, copper, and tin). Thus the activated carbon shows an excellent function of selectively recovering the noble metal. The aqueous solution containing the noble metal may contain other solvents in addition to water, for example, a hydrophilic solvent, such as an alcohol (e.g., ethanol, isopropanol) or a ketone (e.g., acetone).

The pH of the aqueous solution containing the noble metal is not particularly limited to a specific one. For the adsorption and recovery of the noble metal, the aqueous solution may have a pH value within a wide range from strong alkalinity to slight acidity. The reason of this is presumably as follows: the activated carbon of the present invention, which has few surface functional groups susceptible to pH, adsorbs a noble metal by a mechanism different from an adsorption mechanism of a conventional activated carbon, i.e., functional group adsorption.

The aqueous solution containing the noble metal may include, for example, a liquid waste (such as a plating wastewater, or a washing (or a cleaning liquid) used in a step for producing electronic parts), and in addition, a recovered liquid that is obtainable by bringing a solid waste from a catalyst containing a noble metal supported on a solid into a solution. Moreover, prior to the recovery using the activated carbon for noble metal adsorption or noble metal adsorption filter of the present invention, the noble metal may also be recovered by a plurality of methods combined (e.g., separation by electrolysis, chemical reduction, or precipitation due to chemical aggregation). For example, for a wastewater from a noble-metal plating, the noble metal can efficiently be recovered through the following steps: subjecting an undiluted solution containing a high concentration of the noble metal to electrolysis, chemical reduction, or precipitation due to chemical aggregation to separate out the noble metal; and then collecting or trapping the noble metal remaining in the resulting filtrate having a low concentration of the noble metal by the activated carbon for noble metal adsorption or noble metal adsorption filter of the present invention. Moreover, even from a washing that has been washed a product plated with a noble metal, or an aqueous solution having a low concentration of a noble metal that failed to be collected by the above-mentioned electrolysis, chemical reduction or chemical aggregation, the activated carbon for noble metal adsorption or noble metal adsorption filter of the present invention can recover a noble metal with a high adsorption collectability. Thus the activated carbon for noble metal adsorption or noble metal adsorption filter is preferably used.

A method for desorbing a noble metal adsorbed on an activated carbon may include, for example, a method that comprises directly dissociating a noble metal adsorbed on an activated carbon as a noble metal salt with an inorganic strong acid (such as aqua regia) and recovering the noble metal as a simple substance (e.g., metal palladium) by hydrogen reduction or electrolytic reduction; and a method that comprises burning and ashing an activated carbon having a noble metal adsorbed thereon, extracting the noble metal from the resulting ashed product with an inorganic strong acid (such as aqua regia), and reducing the extract.

EXAMPLES

Hereinafter, the following examples are intended to describe this invention in further detail and should by no means be interpreted as defining the scope of the invention. The values of physical properties in Examples were measured by the following methods.

[Specific Surface Area, and Pore Volume of Pores with a Pore Radius of not more than 1 nm]

A sample tube was filled with a sample (0.1 g) and pre-treated at 300° C. for 5 hours under a reduced pressure. The nitrogen adsorption isotherm of the sample in the sample tube was measured at a liquid nitrogen temperature using Belsorp 28SA (manufactured by BEL Japan, Inc.). The resulting adsorption isotherm was analyzed using BEL Analysis Software (Version 4.0.13) to select a pair of variables having the strongest correlation coefficient, one having a relative pressure of not more than 0.01 and the other having a relative pressure of 0.05 to 0.1; and the specific surface area was determined. Moreover, the pore volume of pores with a pore radius of not more than 1 nm was calculated according to CI method using the software.

[Zeta-Potential]

Twenty (20) mg of an activated carbon powder (median particle diameter: 6 to 7 μm) was added to each of an aqueous solution (100 mL) of sodium tetraborate having a concentration of 10 mmol/L and an aqueous solution (100 mL) of sodium tetraborate having a concentration of 0.01 mmol/L to prepare two dispersions. For each of the dispersions, the particle velocity at 25° C. was measured in order to calculate the zeta-potential using a zeta-potential measuring apparatus ("MARKII" manufactured by RANK BROTHERS Ltd.). The measurement of the particle velocity under a voltage of 20 V was carried out by putting the dispersion in a given cell and observing the particles in the dispersion at a measurement site of the cell by a microscope. The particle velocity was determined by measuring the time (second) required for the particle to move through a distance of 60.3 μm. From the average value (S) of 5 to 10 particles measured, the zeta-potential was determined according to the following equations. The distance between electrodes, which is necessary for the calculation, is 8.53 cm.

Electric field $A$ (V/cm)=20/8.53=2.345 V/cm

Particle velocity $L$ (μm/sec)=60.3/$S$

Mobility (μm·cm/sec·V)=$L$/$A$

Zeta-potential (mV)=−12.83×Mobility

[Carbohydrate Solution Decolorizing Performance]

To 350 g of soft brown sugar (manufactured by Mitsui Sugar Co., Ltd.), 300 ml of ion-exchange water was added, and the mixture was stirred for dissolution at a temperature of not higher than 70° C. After the resulting solution was allowed to cool, the pH value of the solution was adjusted to 7±0.1 with NaOH or HCl. Meanwhile, to 300 g of granulated sugar (manufactured by Mitsui Sugar Co., Ltd.), 300 ml of ion-exchange water was added, and the mixture was stirred for dissolution at a temperature of not higher than 70° C. After the resulting solution was allowed to cool, the pH value of the solution was adjusted to 7±0.1 with NaOH or HCl. Proper amounts of the two sugar solutions were mixed so that the mixture had an absorbance within the range of 0.75 to 0.78 at a wavelength of 420 nm. The resulting mixture was used as a stock solution for carbohydrate solution decolorizing performance measurement.

In a 100-ml Erlenmeyer flask with ground-in stopper, 0.092 g of an activated carbon weighed out was put. To the flask, 50 ml of the stock solution for carbohydrate solution decolorizing performance measurement was added. The resulting mixture was shaken at 50° C. at an amplitude of 130 to 140 round trips per minute for one hour. In a thermostatic bath at 50° C., the mixture was filtered through a filter paper 5 C. The absorbance of the filtrate at wavelengths of 420 nm and 700 nm was measured, and the carbohydrate solution decolorizing performance was calculated based on the following equations:

Absorbance (420 nm)−Absorbance (700 nm)=$A$ ($A$(blank)−$A$(sample))/$A$(blank)=Carbohydrate solution decolorizing performance (%)

wherein A(blank) represents A in a case where the activated carbon is not added, A(sample) represents A in a case where the activated carbon is added.

[Oxygen Atom % by XPS]

Each activated carbon before palladium adsorption was measured under measuring conditions (X-ray excitation condition: 100 μm–25 W–15 kV, anticathode: Al, measurement range: 1000 μm×1000 μm, pressure: 6×10$^{-7}$ Pa) by an X-ray photoelectron spectrometer ("PHI Quantera SXM" manufactured by ULVAC-PHI, Inc.), and the oxygen atom % was calculated by wave-form separation analysis of O1s.

[Chemical Bonding State of Palladium by XPS]

For each of activated carbons, palladium was adsorbed thereon, and the chemical bonding state of palladium was measured under measuring conditions (X-ray excitation condition: 100 μm–25 W–15 kV, anticathode: Al, measurement range: 1000 μm×1000 μm, pressure: 6×10$^{-7}$ Pa) by an X-ray photoelectron spectrometer ("PHI Quantera SXM" manufactured by ULVAC-PHI, Inc.). The chemical bonding state in each activated carbon was analyzed from the spectrum of Pd3d. The following shows the assignments of bond species of Pd3d5/2 (reference: XPS Handbook).

Pd: 335.3 eV (±0.2)
PdO: 336.3 eV (±0.2)
halides: 337.1 eV (±0.7)
PdO$_2$: 338.0(±0.3)

[Palladium Adsorption Amount of Various Activated Carbons (Pd Adsorption Test)]

For each of activated carbons, the palladium adsorption amount was determined as follows. The activated carbon was pulverized by a sample mill so that not less than 90% of the pulverized product had a size of not more than 330 Mesh in a particle size distribution based on JIS K1474. The pulverized product was dried at 115° C. for 3 hours and then allowed to cool down to a room temperature in a desiccator to give a sample.

An aqueous solution containing palladium at 26 mg/L was used as a standard solution.

The standard solution (500 ml) was put in an Erlenmeyer flask, and 0.02 g (weighed to the forth decimal place) of the activated carbon was put in the flask and shaken at a shaking frequency of 160 per minute for 2 hours in a thermostatic shaker at 20° C. Thereafter, the resulting mixture was filtered by suction through a membrane filter having a pore size of 0.45 and the concentration of palladium remaining in the filtrate was measured. Fifty (50) μl of nitric acid for harmful metal measurement (manufactured by Wako Pure Chemical Industries, Ltd.) was added to 20 ml of the filtrate, and the concentration of the remaining palladium was determined by an ICP emission spectrophotometer ("Optical Emission Spectrometer Optima 4300 DV" manufactured by PerkinElmer, Inc.). In the same way, the concentration of palladium in the (blank) standard solution, which was free from the activated carbon, was measured. The palladium adsorption per gram of the activated carbon was determined from the difference in the concentration of the remaining palladium according to the following equation:

Palladium adsorption amount (mg/g)=($C1$−$C2$)×0.5÷$W$×1000000 wherein C1: the blank palladium concentration (mg/L), C2: the concentration (mg/L) of palladium remaining in the filtrate after activated carbon adsorption, W: the weight (g) of the activated carbon.

[Pd—Sn Adsorption Amount of Various Activated Carbons (Pd—Sn Adsorption Test)]

An activated carbon sample was prepared in the same manner as in the Pd adsorption test.

A Pd—Sn aqueous solution containing palladium at 20 mg/L and tin at 1000 mg/L (a simulated Pd—Sn catalyst wastewater) was used as a standard solution.

To 500 ml of the simulated Pd—Sn catalyst wastewater, 0.02 g of the activated carbon was added (Simulated catalyst wastewater/the activated carbon=25,000). The mixture was gently stirred at a room temperature (20° C.) for 2 hours using a magnetic stirrer. After stirring, the wastewater containing the activated carbon was filtered by suction through a membrane filter having a pore size of 0.45 μm, and the concentration of palladium and that of tin in the filtrate were measured respectively in the same manner as in the Pd adsorption test.

[Recovery of Noble Metal from Wastewater Containing Noble Metal by Activated Carbon]

The activated carbon was pulverized by a sample mill so that not less than 90% of the pulverized product had a size of not more than 330 Mesh in a particle size distribution based on JIS K1474. The pulverized product was dried at 115° C. for 3 hours and then allowed to cool down to a room temperature in a desiccator to give a sample.

As raw solutions to be subjected to recovery, the following wastewaters were used: a gold-cyan wastewater obtained by separating gold from a gold-containing waste electronic part using a separation solution containing a cyan ion to give a solution having gold dissolved therein; and an aqua regia wastewater containing platinum, gold, and palladium. The compositions of these solutions are shown in Table 2 and Table 3.

The raw solution (100 ml) was put in an Erlenmeyer flask, and 0.5 g (weighed to the forth decimal place) of the activated carbon was put in the flask and shaken at a shaking frequency of 160 per minute for 2 hours in a thermostatic shaker at 20° C. Thereafter, the resulting mixture was filtered by suction through a membrane filter having a pore size of 0.45 μm and washed with water. The noble metal concentration in the raw solution and that in the filtrate after recovery were measured by an ICP emission spectrophotometer in the same manner as in the palladium adsorption amount, and the percent recovery was calculated.

[Liquid-Passing Test of Pd Standard Solution by Various Noble Metal Adsorption Filters]

An aqueous solution containing palladium at 26 mg/L was used as a standard solution.

A noble metal filter was set in a resinous column having an inner diameter of 46 mm, a height of 75 mm, and an internal volume of 125 ml. The standard solution was passed through the filter at a flow rate of 100 ml/minute from the outer-diameter side toward the inner-diameter side by a feed pump ("Master FLEX L/S" manufactured by Cole-Parmer Instrument Company). The change of the palladium concentration in the filtrate after the filtration was measured with time course. Fifty (50) μl of nitric acid for harmful metal measurement (manufactured by Wako Pure Chemical Industries, Ltd.) was added to 20 ml of filtrate, and the concentration of palladium in the filtrate was measured by an ICP emission spectrophotometer ("Optical Emission Spectrometer Optima 4300 DV" manufactured by PerkinElmer, Inc.). The break point of the filter was given by the point of time at which the concentration of palladium in the filtrate reached not less than 20% of the concentration of palladium in the standard solution (the point of time at which the collection of the palladium reached 80%).

[Liquid-Passing Test of Pd—Sn Standard Solution by Various Noble Metal Adsorption Filters]

A Pd—Sn aqueous solution containing palladium at 20 mg/L and tin at 1000 mg/L (a simulated Pd—Sn catalyst wastewater) was used as a standard solution.

A noble metal filter was installed in a housing having an inner diameter of 46 mm, a height of 75 mm, and an internal volume of 125 ml. The standard solution was passed through the filter at each space velocity (SV) (i.e., 100 (1/hr), 178 (1/hr), 300 (1/hr)) at a flow rate of 100 ml/minute from the outer-diameter side toward the inner-diameter side by a feed pump ("Master FLEX L/S" manufactured by Cole-Parmer Instrument Company). The change of the palladium concentration in the filtrate after the filtration was measured with time course. Fifty (50) μl of nitric acid for harmful metal measurement (manufactured by Wako Pure Chemical Industries, Ltd.) was added to 20 ml of the filtrate, and the concentrations of palladium and tin in the filtrate were measured by an ICP emission spectrophotometer ("Optical Emission Spectrometer Optima 4300 DV" manufactured by PerkinElmer, Inc.). The break point of the filter was given by the point of time at which the concentration of palladium in the filtrate reached not less than 20% of the concentration of palladium in the standard solution.

Example 1 (Activated Carbon No. 1)

Figure 1:
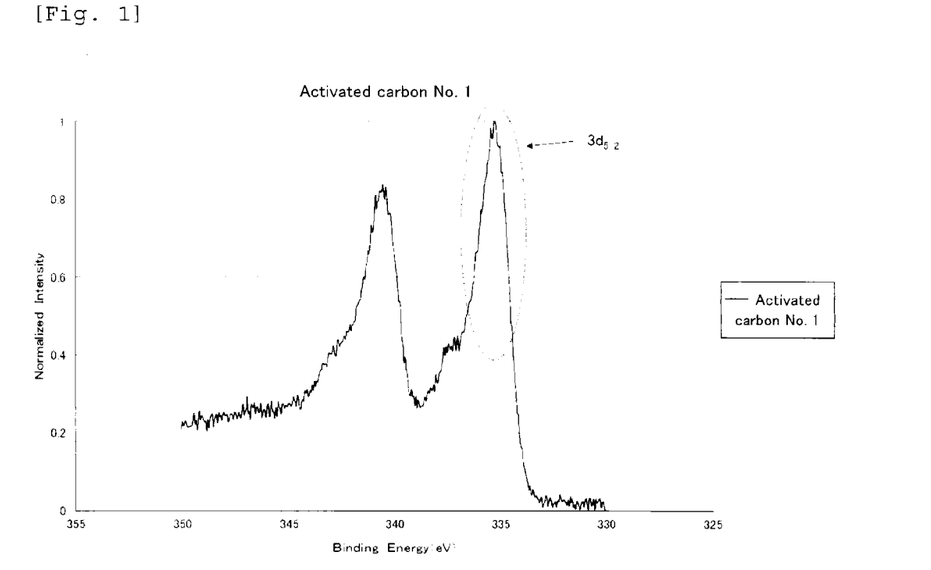
FIG. 1 is an XPS spectrum after palladium adsorption on an activated carbon of Example 1.

A coconut shell charcoal (100 g) containing an alkaline earth metal of 4 g/kg was activated at an activation temperature of 920° C. The gas composition in the activation was as follows: $CO_2$ partial pressure was 10%, $H_2O$ partial pressure was 30%, and the residual gas was $N_2$. The activation time was 20 minutes. The resulting activated carbon was washed with a 1 mol/L aqueous solution of hydrochloric acid and then with water, and then dried. The resulting dried product was heat-treated at 700° C. for 30 minutes in a fluidized-bed furnace. The heat treatment was performed using LNG combustion gas. Table 1 shows the various physical properties, palladium adsorption amount and Pd—Sn adsorption amount of the resulting activated carbon. The activated carbon, which has a zeta-potential difference of as very small as 3.1 mV and a pore volume of pores with a pore radius of not more than 1 nm of as large as 368.3 mm$^3$/g, has a very high capacity to adsorb palladium. Moreover, FIG. 1 shows an XPS spectrum of the activated carbon after palladium adsorption. It is seen that the spectrum has a strong peak at 335 eV, which is assigned to metal palladium. That is, the palladium adsorbed on the activated carbon No. 1 is in the form of reduced palladium metal. Moreover, in the Pd—Sn adsorption test, the adsorption amount of palladium is larger than that of tin; the activated carbon selectively adsorbs palladium rather than tin. Further, Table 2 shows the percent gold recovery from the gold-cyan wastewater by the resulting activated carbon; Table 3 shows the percent noble metal recovery from the aqua regia wastewater by the resulting activated carbon. As apparent from the results of Tables 2 and 3, the activated carbon allows recovery of noble metals from both of wastewaters at high percent recoveries over 99.5%.

Example 2 (Activated Carbon No. 2)

Figure 2:
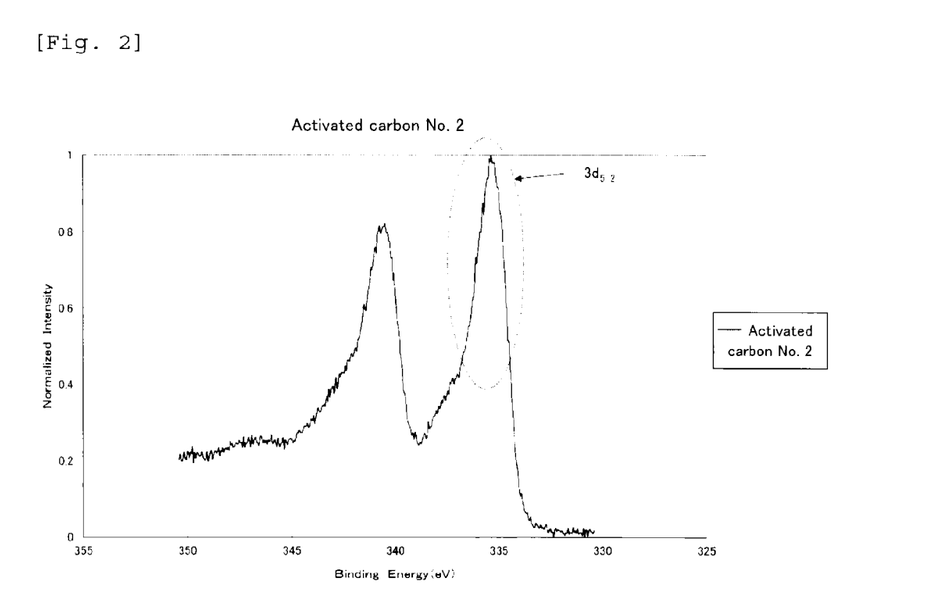
FIG. 2 is an XPS spectrum after palladium adsorption on an activated carbon of Example 2.

A sawdust (100 g) was impregnated with 100 mL of an aqueous solution of zinc chloride having a concentration of 4000 g/L. The impregnated product was heated to 700° C. at rate of 5° C./minute, maintained at 700° C. for one hour, and then allowed to cool. The resulting activated carbon was boiled in a 1 mol/L hydrochloric acid for washing and washed with water. Table 1 shows the various physical properties, Pd adsorption amount and Pd—Sn adsorption amount of the resulting activated carbon. The activated carbon, which has a zeta-potential difference of as very small as 9.7 mV and a pore volume of pores with a pore radius of not more than 1 nm of as large as 317.4 mm$^3$/g, has a high capacity to adsorb palladium. Moreover, FIG. 2 shows an XPS spectrum of the activated carbon after Pd adsorption. It is seen that the spectrum has a strong peak at 335 eV, which is assigned to metal palladium. That is, the palladium adsorbed on the activated carbon No. 2 is in the form of reduced palladium metal. Moreover, in the Pd—Sn adsorption test, the activated carbon only adsorbs palladium without adsorbing tin. The adsorption amount of palladium is extremely larger than that of tin; the activated carbon selectively adsorbs palladium rather than tin.

Example 3 (Activated Carbon No. 3)

A coconut shell charcoal (100 g) containing an alkaline earth metal of 1 g/kg was activated in the same conditions as those in Example 1. The activation time was 3 hours. The resulting activated carbon was washed with a 1 mol/L hydrochloric acid and then with water, and then dried. The resulting dried product was heat-treated in the same manner as in Example 1. Table 1 shows the various physical properties and palladium adsorption amount of the resulting activated carbon. The activated carbon, which has a zeta-potential difference of as somewhat high as 13.5 mV but a pore volume of pores with a pore radius of not more than 1 nm of as extremely large as 443.9 mm$^3$/g, has a high capacity to adsorb palladium.

Example 4 (Activated Carbon No. 4)

A sawdust (100 g) was impregnated with an aqueous solution of phosphoric acid having a concentration of 75% so that the sawdust was impregnated with 150 g of phosphoric acid. The impregnated product was heat-treated at a temperature of 550° C. During the heat treatment, air was passed at a rate of 3 L/minute. After the heat treatment, the resulting burned product was boiled in water for washing. Table 1 shows the various physical properties and palladium adsorption amount of the resulting activated carbon. The activated carbon, which has a zeta-potential difference of as small as 10.4 mV and a pore volume of pores with a pore radius of not more than 1 nm of as extremely large as 403.7 mm$^3$/g, has a high capacity to adsorb palladium.

Example 5 (Activated Carbon No. 5)

A sawdust (100 g) was impregnated with an aqueous solution of phosphoric acid having a concentration of 75% so that the sawdust was impregnated with 100 g of phosphoric acid. The impregnated product was heat-treated at a temperature of 550° C. During the heat treatment, air was passed at a rate of 3 L/minute. After the heat treatment, the resulting burned product was boiled in water for washing. Table 1 shows the various physical properties and palladium adsorption amount of the resulting activated carbon. The activated carbon, which has a zeta-potential difference of 12.7 mV and a pore volume of pores with a pore radius of not more than 1 nm of as relatively large as 294.3 mm$^3$/g, has a high capacity to adsorb palladium.

Example 6 (Activated Carbon No. 6)

Aphenolic resin fiber was subjected to an oxidation treatment at 300° C. for one hour. The oxidation-treated product was dried by distillation at 700° C. for one hour. The phenolic resin fiber obtained by the dry distillation was treated at an activation temperature of 950° C. in an LPG combustion gas atmosphere for 5 hours. Table 1 shows the various physical properties and palladium adsorption amount of the resulting activated carbon. The activated carbon, which has a zeta-potential difference of as somewhat high as 14.9 mV but a pore volume of pores with a pore radius of not more than 1 nm of 200 mm$^3$/g, has a high capacity to adsorb palladium.

Comparative Example 1 (Activated Carbon No. 7)

Figure 3:
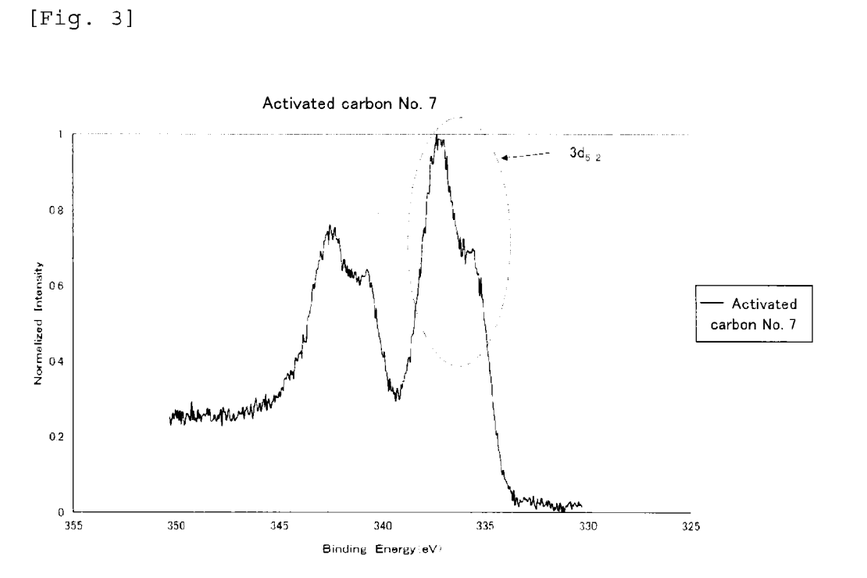
FIG. 3 is an XPS spectrum after palladium adsorption on an activated carbon of Comparative Example 1.

Table 1 shows the various physical properties, palladium adsorption amount and Pd—Sn adsorption amount of a commercially available activated carbon ("GW-H" manufactured by Kuraray Chemical Co., Ltd.). The activated carbon, which has a zeta-potential difference of as high as 21.5 mV and a pore volume of pores with a pore radius of not more than 1 nm of as extremely small as 66 mm$_3$/g, has a low capacity to adsorb palladium. Moreover, FIG. 3 shows an XPS spectrum of the activated carbon after palladium adsorption. It is seen that the spectrum has a strong peak at 337 to 338 eV, which is assigned to palladium oxide. That is, it is apparent that the palladium adsorbed on the activated carbon No. 10 is not reduced and is in the form of palladium oxide. Moreover, in the Pd—Sn adsorption test, although the activated carbon does not adsorb tin, the adsorption amount of palladium is also small.

Comparative Example 2 (Activated Carbon No. 8)

Table 1 shows the various physical properties, palladium adsorption amount and Pd—Sn adsorption amount of a commercially available activated carbon ("KW" manufactured by Kuraray Chemical Co., Ltd.). The activated carbon, which has a zeta-potential difference of as high as 19.3 mV and a pore volume of pores with a pore radius of not more than 1 nm of as extremely small as 89.4 mm$^3$/g, has a low capacity to adsorb palladium. Moreover, in the Pd—Sn adsorption test, the adsorption amount of palladium is small, and tin is adsorbed.

Comparative Example 3 (Activated Carbon No. 9)

A sawdust charcoal obtained from sawdust by dry distillation was activated for 30 minutes in the same conditions as those in Example 1. The resulting activated carbon was washed with a 1 mol/L hydrochloric acid and with water, and then dried. Table 1 shows the various physical properties and palladium adsorption amount of the resulting activated carbon. The activated carbon, which has a zeta-potential difference of as small as 17.5 mV but a pore volume of pores with a pore radius of not more than 1 nm of as small as 117.9 mm$^3$/g, has a low capacity to adsorb palladium.

Comparative Example 4 (Activated Carbon No. 10)

Figure 4:
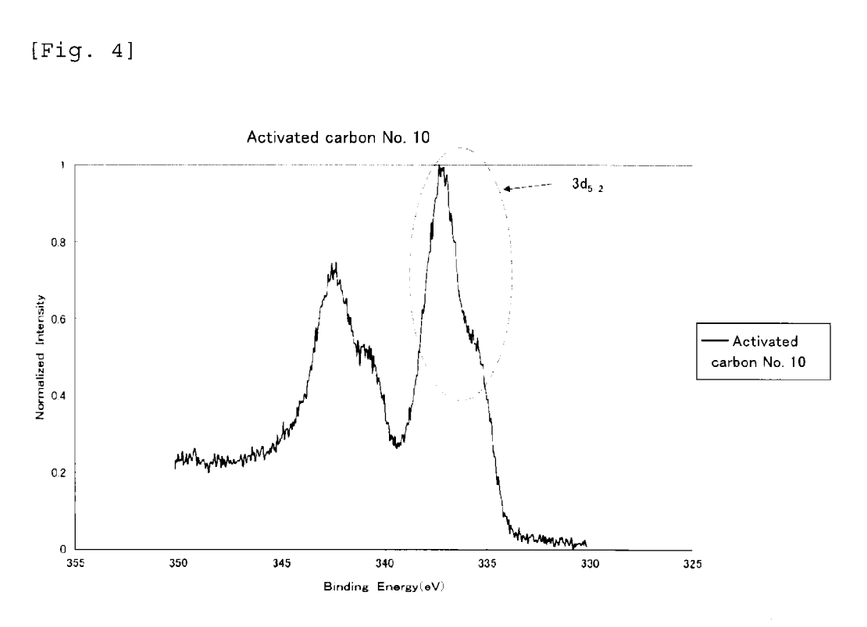
FIG. 4 is an XPS spectrum after palladium adsorption on an activated carbon of Comparative Example 4.

Table 1 shows the various physical properties, palladium adsorption amount and Pd—Sn adsorption amount of a commercially available activated carbon ("GW" manufactured by Kuraray Chemical Co., Ltd.). The activated carbon, which has a zeta-potential difference of as extremely high as 55.6 mV and a pore volume of pores with a pore radius of not more than 1 nm of as extremely small as 35 mm$^3$/g, has a low capacity to adsorb palladium. Moreover, FIG. 4 shows an XPS spectrum of the activated carbon after palladium adsorption. It is seen that the spectrum has a strong peak at 337 to 338 eV, which is assigned to palladium oxide. That is, it is apparent that the palladium adsorbed on the activated carbon No. 10 is not reduced and is in the form of palladium oxide. Moreover, in the Pd—Sn adsorption test, although the activated carbon does not adsorb tin, the adsorption amount of palladium is also small.

Comparative Example 5 (Activated Carbon No. 11)

A phenolic resin fiber was subjected to an oxidation treatment at 300° C. for one hour. The oxidation-treated product was dried by distillation at 700° C. for one hour. The phenolic resin fiber obtained by the dry distillation was treated at an activation temperature of 950° C. in an LPG combustion gas atmosphere for 3 hours. Table 1 shows the various physical properties and palladium adsorption amount of the resulting activated carbon. The activated carbon, which has a zeta-potential difference of as high as 20.0 mV and a pore volume of pores with a pore radius of not more than 1 nm of as extremely small as 45.7 mm$^3$/g, has a low capacity to adsorb palladium.

TABLE 1

| | Examples | | | | | | Comparative Examples | | | | |
|---|---|---|---|---|---|---|---|---|---|---|---|
| | 1 | 2 | 3 | 4 | 5 | 6 | 1 | 2 | 3 | 4 | 5 |
| Activated carbon No. | 1 | 2 | 3 | 4 | 5 | 6 | 7 | 8 | 9 | 10 | 11 |
| Specific surface area (m$^2$/g) | 1999 | 1748 | 2327 | 2242 | 1819 | 2090 | 1490 | 1313 | 1192 | 1136 | 1488 |
| Pore volume (mm$^3$/g) | 368.3 | 317.4 | 443.9 | 403.7 | 294.3 | 200 | 66 | 89.4 | 117.9 | 35 | 45.7 |
| Zeta-potential difference (mV) | 3.1 | 9.7 | 13.5 | 10.4 | 12.7 | 14.9 | 21.5 | 19.3 | 17.5 | 55.6 | 20.0 |
| Carbohydrate solution decolorizing performance (%) | 71.3 | 65 | 36.2 | 60.6 | 50.2 | 17.9 | 20.7 | 27.4 | 45.1 | 13.1 | 7.9 |
| Oxygen atom % (%) | 5.9 | 9.9 | 7.1 | 17.1 | 19.6 | 15.7 | 11.6 | 12.9 | 11.9 | 12.6 | 18.5 |
| (Pd Adsorption test) | | | | | | | | | | | |
| Pd Adsorption amount (mg/g) | 277.5 | 177 | 236.1 | 232.8 | 198.8 | 146.6 | 110.9 | 93 | 120.4 | 44.8 | 59.2 |
| (Pd—Sn Adsorption test) | | | | | | | | | | | |
| Pd Adsorption amount (mg/g) | 282.1 | 279.4 | — | — | — | — | 68.1 | 66.5 | — | 15.8 | — |
| Sn Adsorption amount (mg/g) | 39.1 | 0 | — | — | — | — | 0 | 49.3 | — | 0 | — |

TABLE 2

| | Au (mg/L) | CN$^-$ (mg/L) | pH |
|---|---|---|---|
| Wastewater before treatment | 39 | 0.5 | 11 |
| Wastewater after treatment | less than 0.2 | less than 0.3 | 11 |
| Percent recovery | over 99.50 | — | — |

TABLE 3

| | Pt (mg/L) | Au (mg/L) | Pd (mg/L) |
|---|---|---|---|
| Wastewater before treatment | 22 | 21 | 49 |
| Wastewater after treatment | less than 0.2 | less than 0.3 | less than 0.3 |
| Percent recovery | over 99.5% | over 99.5% | over 99.5% |

Example 7 (Noble Metal Adsorption Filter A)

In a 100-L small-sized beater (beating machine), 100 L of tap water and 1.5 kg (dry weight) of the fibrous activated carbon No. 6 were put. Then 0.075 kg (on the basis of dry weight) of a fibrillated acrylic pulp ("Bi-PUL/F" manufactured by Japan Exlan Co., Ltd.) as a binder was put in the beater. The fibrous activated carbon and the binder were mixed for dispersion, and the fibrous activated carbon was fragmented by narrowing a clearance between a fixed tooth and a rotating tooth of the beater. In a case where a fibrous activated carbon having a shorter fiber length is formed into a given shape, the weight per unit volume increases due to an improved filling degree. This weight per unit volume was referred to as a beating density and was used as a measure of the shortness of a fibrous activated carbon. A formed product for measuring the beating density was produced as follows. A double-pipe forming die described in Japanese Patent No. 3516811 was provided. The forming die had a shaft having a large number of small suction holes at a pitch of 5 mm; each small suction hole had a size of 3 mmφ. The shaft was wrapped with a 300-mesh wire gauze to give a die having a shaft diameter of 18 mmφ, an outer diameter (flange diameter) of 40 mmφ, and an inter-flange distance of 50 mm. The slurry was sucked from the central (or internal) part of the resulting die to give a cylindrical formed product. From the size and the weight of the dried formed product, the beating density of the slurry of the formed product was determined to be 0.18 g/ml. The slurry having this beating density was used as a standard slurry.

The activated carbon No. 1 was pulverized so that the D50 measured by a wet particle size analyzer ("MICROTRAC MT3000" manufactured by Nikkiso Co., Ltd.) was about 40 μm. The pulverized activated carbon No. 1 (0.09 kg) and a fibrillated acrylic pulp (Bi-PUL/F) (0.0045 kg in terms of dry weight) were added to 14 L of the standard slurry. The resulting slurry was made to 20 L with tap water.

A die having the same shape as the die for beating density measurement was provided. This die had a shaft having an outer diameter (flange diameter) of 35 mmφ, a shaft diameter of 10 mmφ, and an inter-flange distance of 145 mm. A nonwoven fabric ("9540F" manufactured by Shinwa Corp.) formed into a cylindrical shape was installed on the die. The slurry was accumulated on the die by suction, dried and then cut to give a formed product having an outer diameter of 35 mmφ, an inner diameter of 10 mmφ, and a height of 71.5 mm. An outer side of the formed product was wrapped with a single layer of a spunbonded nonwoven fabric ("T0703WDO" manufactured by Unitika, Ltd.) to give a filter for the Liquid-passing test of Pd standard solution. The formed product weighed 13.35 g.

The resulting sample (filter) for evaluation was subjected to the liquid-passing test of the Pd standard solution. The results showed that the filter had a break point of 23 L.

In the same manner as in the production process of the filter for the liquid-passing test of the Pd standard solution, a formed product having an outer diameter of 20 mmφ, an inner diameter of 10 mmφ, and a height of 71.5 mm was produced and used as a filter for the liquid-passing test of the Pd—Sn standard solution. The weight of the formed product used for each test was shown in Table 4.

The resulting sample (filter) for evaluation was subjected to the liquid-passing test of the Pd—Sn standard solution. The results showed that the filter had a high weight and high break point at each space velocity.

Since the activated carbon No. 1 used has a carbohydrate solution decolorizing performance of as an extremely high as 90.7%, the filter has a high filterability.

Example 8 (Noble Metal Adsorption Filter B)

The activated carbon No. 2 (0.09 kg) having a D50 of about 400 μm and a fibrillated acrylic pulp (Bi-PUL/F) (0.0045 kg in terms of dry weight) were added to 14 L of the standard slurry as the same as the slurry used in Example 7. The resulting slurry was made to 20 L with tap water. The suction forming and the nonwoven fabric processing were carried out in the same manner as in Example 7, and a filter for the liquid-passing test of the Pd standard solution was obtained. The formed product weighed 12.50 g. The resulting sample (filter) for evaluation was subjected to the liquid-passing test of the Pd standard solution. The results showed that the filter had a break point of 15 L.

In the same manner as in the production process of the filter for the liquid-passing test of the Pd standard solution, a formed product having an outer diameter of 20 mmϕ, an inner diameter of 10 mmϕ, and a height of 71.5 mm was produced and used as a filter for the liquid-passing test of the Pd—Sn standard solution. The weight of the formed product used for each test was shown in Table 4. The resulting sample (filter) for evaluation was subjected to the liquid-passing test of the Pd—Sn standard solution. The results showed that the filter had a high weight and a high break point at each space velocity.

Since the activated carbon No. 2 used has a carbohydrate solution decolorizing performance of as an extremely high as 82.7%, the filter has a high filterability.

Reference Example 1 (Noble Metal Adsorption Filter C)

The standard slurry (20 L) alone as the same as the slurry used in Example 7 was subjected to the suction forming and the nonwoven fabric processing in the same manner as in Example 7 to give a filter for the liquid-passing test of the Pd standard solution. The formed product weighed 11.20 g. The resulting sample (filter) for evaluation was subjected to the liquid-passing test of the Pd standard solution. The results showed that the filter had a break point of 1 L.

In the same manner as in the production process of the filter for the liquid-passing test of the Pd standard solution, a formed product having an outer diameter of 20 mmϕ, an inner diameter of 10 mmϕ, and a height of 71.5 mm was produced and used as a filter for the liquid-passing test of the Pd—Sn standard solution. The weight of the formed product used for each test was shown in Table 4. The resulting sample (filter) for evaluation was subjected to the liquid-passing test of the Pd—Sn standard solution. The results showed that the filter had a low weight and a low break point at each space velocity. In particular, as apparent from the break point at SV of 178 (1/hr) and 300 (1/hr), the filter had been broken at the start of the liquid passing.

Since the activated carbon No. 6 used has an excellent palladium adsorption in the thermostatic shaker and a carbohydrate solution decolorizing performance as low as 22.8% in the above-mentioned experiments, the filter has a low adsorption speed and a low filterability.

Comparative Example 6 (Noble Metal Adsorption Filter D)

The activated carbon No. 7 was pulverized so that the D50 was about 40 μm. The pulverized activated carbon No. 7 (0.09 kg) and Bi-PUL/F (0.0045 kg in terms of dry weight) were added to 14 L of the standard slurry as the same as that in Example 7. The resulting slurry was made to 20 L with tap water. The suction forming and the nonwoven fabric processing were carried out in the same manner as in Example 7, and a filter for the liquid-passing test of the Pd standard solution was obtained. The formed product weighed 14.09 g. The resulting sample (filter) for evaluation was subjected to the liquid-passing test of the Pd standard solution. The results showed that the filter had a break point of 2.5 L.

In the same manner as in the production process of the filter for the liquid-passing test of the Pd standard solution, a formed product having an outer diameter of 20 mmϕ, an inner diameter of 10 mmϕ, and a height of 71.5 mm was produced and used as a filter for the liquid-passing test of the Pd—Sn standard solution. The weight of the formed product used for each test was shown in Table 4. The resulting sample (filter) for evaluation was subjected to the liquid-passing test of the Pd—Sn standard solution. The results showed that the filter had a high weight and a low break point at each space velocity. In particular, as apparent from the break point at SV of 178 (1/hr) and 300 (1/hr), the filter had been broken at the start of the liquid passing.

Since the activated carbon No. 7 has not only a zeta-potential difference of as high as 21.5 mV but also a carbohydrate solution decolorizing performance of as low as 26.3%, the filter has a low filterability.

Comparative Example 7 (Noble Metal Adsorption Filter E)

The activated carbon No. 10 was pulverized so that the D50 was about 40 μm. The pulverized activated carbon No. 10 (0.09 kg) and a fibrillated acrylic pulp (Bi-PUL/F) (0.0045 kg in terms of dry weight) were added to 14 L of the standard slurry as the same as that in Example 7. The resulting slurry was made to 20 L with tap water. The suction forming and the nonwoven fabric processing were carried out in the same manner as in Example 7, and a filter for the liquid-passing test of the Pd standard solution was obtained. The formed product weighed 14.07 g. The resulting sample (filter) for evaluation was subjected to the liquid-passing test of the Pd standard solution. The results showed that the filter had a break point of 2 L.

In the same manner as in the production process of the filter for the liquid-passing test of the Pd standard solution, a formed product having an outer diameter of 20 mmϕ, an inner diameter of 10 mmϕ, and a height of 71.5 mm was produced and used as a filter for the liquid-passing test of the Pd—Sn standard solution. The weight of the formed product used for each test was shown in Table 4. The resulting sample (filter) for evaluation was subjected to the liquid-passing test of the Pd—Sn standard solution. The results showed that the filter had a high weight and a low break point at each space velocity. In particular, as apparent from the break point at SV of 178 (1/hr) and 300 (1/hr), the filter had been broken at the start of the liquid passing.

Since the activated carbon No. 10 has not only a zeta-potential difference of as extremely high as 55.6 mV but also a carbohydrate solution decolorizing performance of as low as 16.6%, the filter has a low filterability.

Table 4 shows the results of liquid-passing test of the filter obtained in Examples 7 to 8, Reference Example 1 and Comparative Examples 6 to 7.

TABLE 4

| | | Example 7 | Example 8 | Reference Example 1 | Comparative Example 6 | Comparative Example 7 |
|---|---|---|---|---|---|---|
| Mixing ratio | Filter | A | B | C | D | E |
| | Activated carbon No. 1 | 0.09 parts | | | | |
| | Activated carbon No. 2 | | 0.09 parts | | | |
| | Activated carbon No. 6 | 0.21 parts | 0.21 parts | 0.3 parts | 0.21 parts | 0.21 parts |
| | Activated carbon No. 7 | | | | 0.09 parts | |
| | Activated carbon No. 10 | | | | | 0.09 parts |
| | Binder | 0.015 parts | 0.015 parts | 0.015 parts | 0.015 parts | 0.015 parts |
| (Pd Liquid-passing test) | | | | | | |
| | Break point (L) | 23 | 15 | 1 | 2.5 | 2 |
| (Pd—Sn Liquid-passing test) | | | | | | |
| | SV100 weight (g) | 3.46 | 3.30 | 2.94 | 3.68 | 3.95 |
| | SV178 weight (g) | 3.57 | 3.28 | 3.02 | 3.76 | 3.82 |
| | SV300 weight (g) | 3.54 | 3.35 | 2.98 | 3.72 | 3.78 |
| (Pd—Sn Liquid-passing test) | | | | | | |
| | SV100 break point (L) | 4.00 | 3.65 | 0.14 | 0.30 | 0.28 |
| | SV178 break point (L) | 3.81 | 3.46 | — | — | — |
| | SV300 break point (L) | 3.53 | 3.21 | — | — | — |

INDUSTRIAL APPLICABILITY

The activated carbon of the present invention is used for recovering a noble metal from an aqueous solution containing the noble metal. In particular, the activated carbon is useful for recovering a noble metal from a plating wastewater containing a low concentration of the noble metal.

The invention claimed is:

1. A method for recovering a noble metal from an aqueous solution comprising the noble metal, the method comprising:
    adsorbing the noble metal on a filter, the filter comprising:
        an activated carbon in a proportion of not less than 20% by mass; and
        a binder;
    wherein:
    the activated carbon adsorbs a noble metal from an aqueous solution comprising the noble metal;
    the activated carbon has a difference in absolute value of not more than 18 mV between a zeta-potential in a 10 mmol/L aqueous solution of sodium tetraborate and a zeta-potential in a 0.01 mmol/L aqueous solution of sodium tetraborate; and
    the activated carbon has a total pore volume of pores with a pore radius of not more than 1 nm of 150 to 500 mm$^3$/g.

2. The method according to claim 1, wherein:
    the filter is a liquid-permeable filter; and
    the activated carbon has a carbohydrate solution decolorizing performance of not less than 30%.

3. The method according to claim 1, wherein the aqueous solution comprising the noble metal is a plating wastewater.

4. The method according to claim 1, wherein the activated carbon has a difference in absolute value between a zeta-potential in a 10 mmol/L aqueous solution of sodium tetraborate and a zeta-potential in a 0.01 mmol/L aqueous solution of sodium tetraborate of not more than 5 mV.

5. The method according to claim 1, wherein the activated carbon has a difference in absolute value between a zeta-potential in a 10 mmol/L aqueous solution of sodium tetraborate and a zeta-potential in a 0.01 mmol/L aqueous solution of sodium tetraborate of 5 to 12 mV.

6. The method according to claim 1, wherein the activated carbon has a total pore volume of pores with a pore radius of not more than 1 nm of 300 to 400 mm$^3$/g.

7. The method according to claim 1, wherein the activated carbon has a carbohydrate solution decolorizing performance of 80 to 97%.

8. The method according to claim 1, wherein the activated carbon has a BET specific surface area, calculated by a nitrogen adsorption method, of about 1,500 to 2,300 m$^2$/g.

9. The method according to claim 1, wherein the activated carbon comprises a granulated activated carbon having an average primary particle diameter of about 1 μm to 5 mm.

10. The method according to claim 1, wherein the activated carbon comprises a fibrous activated carbon having an average fiber diameter of about 2 to 300 μm.

11. The method according to claim 1, the filter comprises the activated carbon in a proportion of 30 to 95% by mass.

12. The method according to claim 1, wherein the binder comprises at least one fibrillated fiber selected from the group consisting of an acrylic fiber, a polyethylene fiber, a polypropylene fiber, a polyacrylonitrile fiber, a cellulose fiber, a polyamide fiber, and an aramid fiber.

13. The method according to claim 1, wherein the binder comprises a thermoplastic polymer selected from the group consisting of a polyethylene, a polypropylene, a polystyrene, an ethylene vinyl acetate copolymer, a polyethylene terephthalate), a poly(butylene terephthalate), and a poly(methyl methacrylate).

14. The method according to claim 1, wherein the noble metal comprises at least one of palladium and platinum.

* * * * *